(12) United States Patent
Makita et al.

(10) Patent No.: US 7,759,451 B2
(45) Date of Patent: Jul. 20, 2010

(54) FUMARIC DIESTER COPOLYMER

(75) Inventors: Kenichi Makita, Mie (JP); Toru Doi, Mie (JP)

(73) Assignee: Tosoh Corporation, Shunan-shi (JP)

( * ) Notice: Subject to any disclaimer, the term of this patent is extended or adjusted under 35 U.S.C. 154(b) by 490 days.

(21) Appl. No.: 11/326,512

(22) Filed: Jan. 6, 2006

(65) Prior Publication Data
US 2007/0298247 A1    Dec. 27, 2007

(30) Foreign Application Priority Data

Jan. 13, 2005   (JP)   ............................. 2005-006535
Mar. 11, 2005   (JP)   ............................. 2005-069359

(51) Int. Cl.
*C08G 63/16*   (2006.01)
*B05D 1/18*    (2006.01)

(52) U.S. Cl. .................. 528/302; 428/333; 428/336
(58) Field of Classification Search .............. 528/302; 428/333, 336
See application file for complete search history.

(56) References Cited

U.S. PATENT DOCUMENTS

| | | | | |
|---|---|---|---|---|
| 5,266,434 A | * | 11/1993 | Hirayama et al. | 430/110.4 |
| 5,416,180 A | * | 5/1995 | Yokoyama et al. | 526/245 |
| 6,770,737 B2 | * | 8/2004 | Kakuchi et al. | 528/406 |
| 7,160,587 B2 | * | 1/2007 | Doi | 428/1.6 |
| 2002/0137867 A1 | * | 9/2002 | Asami et al. | 526/266 |
| 2005/0059777 A1 | * | 3/2005 | Doi | 525/54.23 |

FOREIGN PATENT DOCUMENTS

| | | | |
|---|---|---|---|
| EP | 0788118 | * | 8/1997 |
| JP | 62-72710 | | 4/1987 |
| JP | 5-11220 | | 1/1993 |
| JP | 8-5969 | | 1/1996 |

OTHER PUBLICATIONS

Notification of Reasons for Refusal for JP 2005-006535 issued on Mar. 9, 2010.*

* cited by examiner

*Primary Examiner*—Milton I Cano
*Assistant Examiner*—Gennadiy Mesh
(74) *Attorney, Agent, or Firm*—Oblon, Spivak, McClelland, Maier & Neustadt, L.L.P.

(57) ABSTRACT

A novel fumaric diester copolymer suitable for used in an optical material having excellent heat resistance and transparency is provided. The fumaric diester copolymer comprises a specific fumaric diester residue, and at least one (meth)acrylic ester residue unit selected from a specific (meth)acrylic ester residue unit having an oxetanyl group and a specific (meth)acrylic ester residue unit having a tetrahydrofurfuryl group, and has a number average molecular weight of from 1,000 to 500,000.

19 Claims, 2 Drawing Sheets

FUMARIC DIESTER COPOLYMER

FIELD OF THE INVENTION

The present invention relates to a novel fumaric diester copolymer. More particularly, it relates to a novel fumaric diester copolymer having excellent heat resistance and transparency.

BACKGROUND OF THE INVENTION

It is known that homopolymers or copolymers obtained from a fumaric diester show high heat resistance as compared with general thermoplastic vinyl polymers, and further give a resin having excellent transparency. For example, a homopolymer obtained from diisopropyl fumarate or dicyclohexyl fumarate does not show its softening point or glass transition temperature even at a temperature of 200° C. or higher, and therefore is a promising material as a transparent resin usable in various applications in an optical field (see, for example, Patent Document 1 or Non-Patent Document 1)

[Patent Document 1]: JP-B-5-40281 (The term "JP-B" used herein means an "examined Japanese patent publication")

[Non-Patent Document 1]: Takayuki Otsu, Mirai Zairyo (Feature Materials), 2002, Vol. 2, No. 12 (pp 70-74)

However, Patent Document 1 and Non-Patent Document 1 do not describe a copolymer comprising a fumaric diester residue unit, and a (meth)acrylic ester residue unit having an oxetanyl group and/or a (meth)acrylic ester residue unit having a tetrahydrofurfuryl group.

SUMMARY OF THE INVENTION

Accordingly, an object of the present invention is to provide a novel fumaric diester copolymer having excellent heat resistance and transparency.

As a result of intensive investigations to solve the above-described problems, the present inventors have found a novel fumaric diester copolymer, leading the accomplishment of the present invention.

The gists of the present invention reside in the following (1) to (14).

(1) A fumaric diester copolymer comprising a fumaric diester residue unit represented by the following general formula (1), and at least one (meth)acrylic ester residue unit selected from a (meth)acrylic ester residue unit having an oxetanyl group represented by the following general formula (2) and a (meth)acrylic ester residue unit having a tetrahydrofurfuryl group represented by the following general formula (3), the copolymer having a number average molecular weight of from 1,000 to 500,000,

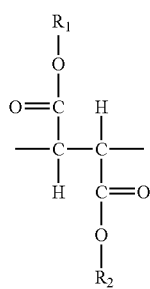

(1)

(wherein $R_1$ and $R_2$ each independently represents a linear alkyl group having from 1 to 6 carbon atoms, a branched alkyl group having from 1 to 6 carbon atoms, or a cyclic alkyl group having from 3 to 6 carbon atoms,)

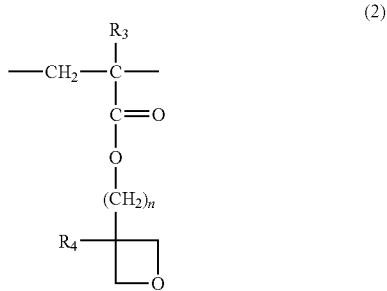

(2)

(wherein $R_3$ represents hydrogen or methyl group, $R_4$ represents hydrogen, a linear alkyl group having from 1 to 4 carbon atoms, or a branched alkyl group having from 1 to 4 carbon atoms, and n is 1 or 2,)

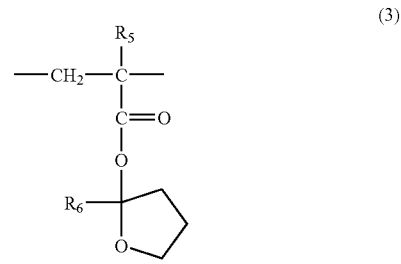

(3)

(wherein $R_5$ represents hydrogen or methyl group, $R_6$ represents hydrogen, a linear alkyl group having from 1 to 4 carbon atoms, or a branched alkyl group having from 1 to 4 carbon atoms.)

(2) The fumaric diester copolymer as described in (1) above, wherein the fumaric diester residue unit is a diisopropyl fumarate residue unit.

(3) The fumaric diester copolymer as described in (1) above, wherein the (meth)acrylic ester residue unit is 3-ethyl-3-oxetanylmethyl acrylate residue, 3-ethyl-3-oxetanylmethyl methacrylate residue, tetrahydrofurfuryl acrylate residue, or tetrahydrofurfuryl methacrylate residue.

(4) A crosslinked product of a fumaric diester copolymer, obtained by crosslinking the fumaric diester copolymer as described in (1) to (3) above.

(5) A film comprising the crosslinked product of a fumaric diester copolymer as described in (4) above.

(6) An optical film for display, comprising the film as described in (5) above, the film being a crosslinked film having a thickness of from 10 to 700 μm, and a gel fraction as determined by a tetrahydrofuran insoluble content of 10% or more.

(7) The optical film for display as described in (6) above, having a total light transmittance of 85% or higher, a light transmittance at 400 nm of 80% or higher, and a haze of 2% or lower.

(8) The optical film for display as described in (6) or (7) above, having a thickness unevenness of 10 μm or less, a retardation measured from a front of a film of 10 nm or less, and a retardation unevenness within the film plane of 5 nm or less.

(9) The optical film for display as described in (6) to (8) above, further comprising at least one gas barrier layer laminated thereon.

(10) The optical film for display as described in (6) to (9) above, further comprising at least one hard coat layer laminated thereon.

(11) A film for protecting a polarizing plate, comprising the optical film for display as described in (6) to (10) above.

(12) A retardation film comprising the optical film for display as described in (6) to (10) above.

(13) A touch panel film comprising the optical film for display as described in (6) to (10) above.

(14) A film substrate for flat panel display, comprising the optical film for display as described in (6) to (10) above.

(15) A plastic film substrate for liquid crystal display, comprising the optical film for display as described in (6) to (10) above.

DETAILED DESCRIPTION OF THE INVENTION

Figure 1:
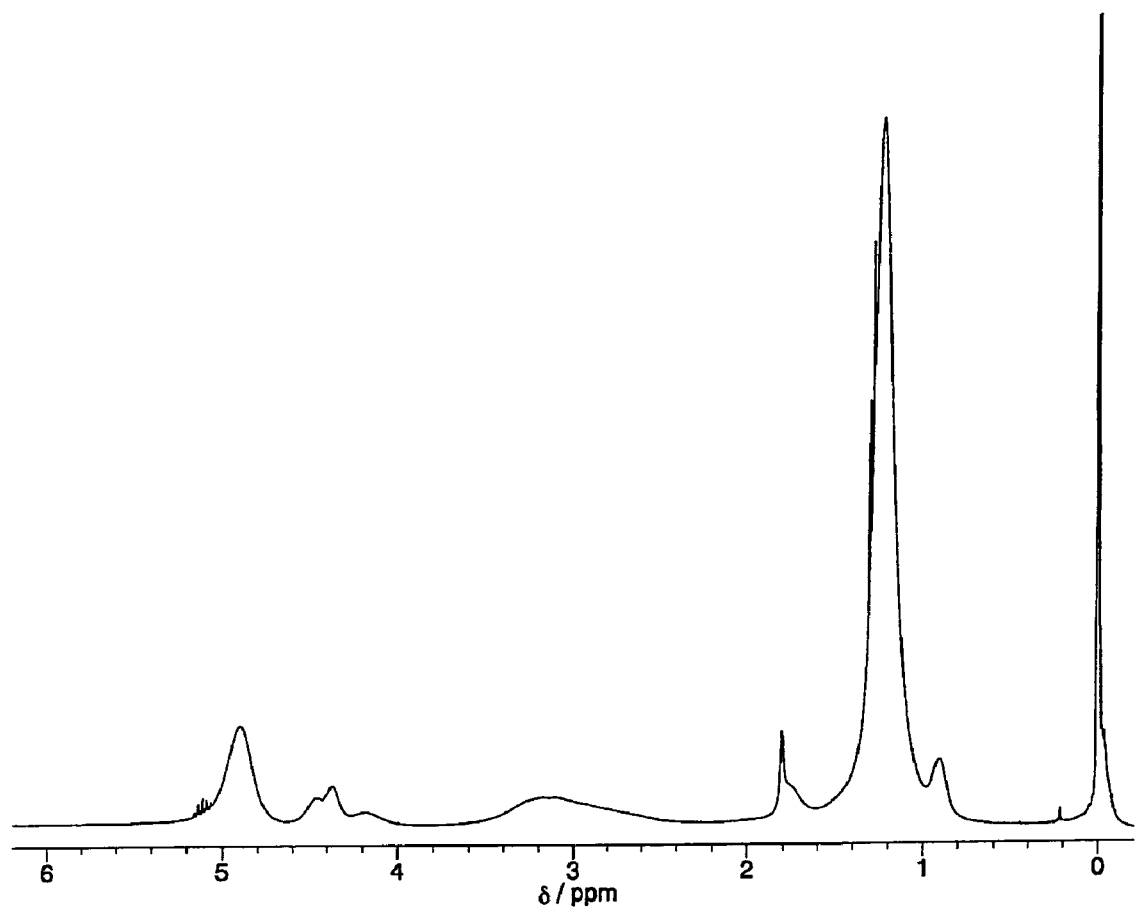
FIG. 1 is $^1$H-NMR spectrum in $CDCl_3$ of the fumaric diester copolymer obtained in Example 1.

The present invention is described in detail below.

The fumaric diester copolymer of the present invention is a copolymer comprising a fumaric diester residue unit represented by the specific general formula (1), and at least one (meth)acrylic ester residue unit selected from a (meth)acrylic ester residue unit having an oxetanyl group represented by the specific general formula (2) and a (meth)acrylic ester residue unit having a tetrahydrofurfuryl group represented by the specific general formula (3). $R_1$ and $R_2$ in the fumaric diester residue unit represented by the general formula (1) each independently represents a linear alkyl group having from 1 to 6 carbon atoms, a branched alkyl group having from 1 to 6 carbon atoms, and a cyclic alkyl group having from 3 to 6 carbon atoms. Examples of the linear alkyl group having from 1 to 6 carbon atoms include methyl group, ethyl group, propyl group, n-butyl group, pentyl group, and hexyl group. Examples of the branched alkyl group having from 1 to 6 carbon atoms include isopropyl group, isobutyl group, sec-butyl group, and tert-butyl group. Examples of the cyclic alkyl group having from 3 to 6 carbon atoms include cyclopropyl group, cyclobutyl group, and cyclohexyl group. Of those, isopropyl group, tert-butyl group, and cyclohexyl group are preferable, and isopropyl group is more preferable, from that the fumaric diester copolymer obtained has excellent heat resistance.

Examples of the fumaric diester residue unit represented by the general formula (1) include dimethyl fumarate residue, diethyl fumarate residue, dipropyl fumarate residue, di-n-butyl fumarate residue, dipentyl fumarate residue, dihexyl fumarate residue, diisopropyl fumarate residue, diisobutyl fumarate residue, di-sec-butyl fumarate residue, di-tert-butyl fumarate residue, dicyclopropyl fumarate residue, dicyclobutyl fumarate residue, and dicyclohexyl fumarate residue. Of those, diisopropyl fumarate residue, di-tert-butyl fumarate residue, and dicyclohexyl fumarate residue are preferable, and diisopropyl fumarate residue is more preferable.

In the (meth)acrylic ester residue unit having an oxetanyl group represented by the general formula (2) in the fumaric diester copolymer of the present invention, $R_3$ is hydrogen or methyl group; $R_4$ is hydrogen, a linear alkyl group having from 1 to 4 carbon atoms, or a branched alkyl group having from 1 to 4 carbon atoms; and n is 1 or 2. Examples of the linear alkyl group having from 1 to 4 carbon atoms in $R_4$ include methyl group, ethyl group, propyl group and n-butyl group. Examples of the branched alkyl group having from 1 to 4 carbon atoms include isopropyl group, isobutyl group, sec-butyl group, and tert-butyl group.

Examples of the (meth)acrylic ester residue unit having an oxetanyl group represented by the general formula (2) include 3-oxetanylmethyl acrylate residue, 3-methyl-3-oxetanylmethyl acrylate residue, 3-ethyl-3-oxetanylmethyl acrylate residue, 3-propyl-3-oxetanylmethyl acrylate residue, 3-n-butyl-3-oxetanylmethyl acrylate residue, 3-isopropyl-3-oxetanylmethyl acrylate residue, 3-isobutyl-3-oxetanylmethyl acrylate residue, 3-sec-butyl-3-oxetanyl-methyl acrylate residue, 3-tert-butyl-3-oxetanylmethyl acrylate residue, 3-oxetanylethyl acrylate residue, 3-methyl-3-oxetanylethyl acrylate residue, 3-ethyl-3-oxetanylethyl acrylate residue, 3-propyl-3-oxetanylethyl acrylate residue, 3-n-butyl-3-oxetanylethyl acrylate residue, 3-isopropyl-3-oxetanylethyl acrylate residue, 3-isobutyl-3-oxetanylethyl acrylate residue, 3-sec-butyl-3-oxetanylethyl acrylate residue, 3-tert-butyl-3-oxetanyl-ethyl acrylate residue, 3-oxetanylmethyl methacrylate residue, 3-methyl-3-oxetanylmethyl methacrylate residue, 3-ethyl-3-oxetanylmethyl methacrylate residue, 3-propyl-3-oxetanylmethyl methacrylate residue, 3-n-butyl-3-oxetanylmethyl methacrylate residue, 3-isopropyl-3-oxetanylmethyl methacrylate residue, 3-isobutyl-3-oxetanylmethyl methacrylate residue, 3-sec-butyl-3-oxetanylmethyl methacrylate residue, 3-tert-butyl-3-oxetanylmethyl methacrylate residue, 3-oxetanylethyl methacrylate residue, 3-methyl-3-oxetanylethyl methacrylate residue, 3-ethyl-3-oxetanylethyl methacrylate residue, 3-propyl-3-oxetanylethyl methacrylate residue, 3-n-butyl-3-oxetanylethyl methacrylate residue, 3-isopropyl-3-oxetanylethyl methacrylate residue, 3-isobutyl-3-oxetanylethyl methacrylate residue, 3-sec-butyl-3-oxetanylethyl methacrylate residue, and 3-tert-butyl-3-oxetanylethyl methacrylate residue.

In the (meth)acrylic ester residue unit having a tetrahydrofurfuryl group represented by the general formula (3) in the fumaric diester copolymer of the present invention, $R_5$ is hydrogen or methyl group; $R_6$ is hydrogen, a linear alkyl group having from 1 to 4 carbon atoms, or a branched alkyl group having from 1 to 4 carbon atoms. Examples of the linear alkyl group having from 1 to 4 carbon atoms in $R_6$ include methyl group, ethyl group, propyl group and n-butyl group. Examples of the branched alkyl group having from 1 to 4 carbon atoms include isopropyl group, isobutyl group, sec-butyl group, and tert-butyl group.

Examples of the (meth)acrylic ester residue unit having a tetrahydrofurfuryl group represented by the general formula (3) include tetrahydrofurfuryl acrylate residue, 2-methyltetrahydrofurfuryl acrylate residue, 2-ethyltetrahydrofurfuryl acrylate residue, 2-propyl-tetrahydrofurfuryl acrylate residue, 2-n-butyltetrahydrofurfuryl acrylate residue, 2-isopropyltetrahydrofurfuryl acrylate residue, 2-isobutyltetrahydrofurfuryl acrylate residue, 2-sec-butyltetrahydrofurfuryl acrylate residue, 2-tert-butyltetrahydrofurfuryl acrylate residue, tetrahydrofurfuryl methacrylate residue, 2-methyltetrahydrofurfuryl methacrylate residue, 2-ethyltetrahydrofurfuryl methacrylate residue, 2-propyltetrahydrofurfuryl methacrylate residue, 2-n-butyltetrahydrofurfuryl methacrylate residue, 2-isopropyltetrahydrofurfuryl methacrylate residue, 2-isobutyltetrahydrofurfuryl methacrylate residue, 2-sec-butyltetrahydrofurfuryl methacrylate residue, and 2-tert-butyltetrahydrofurfuryl methacrylate residue.

Of those (meth)acrylic ester residue units, 3-ethyl-3-oxetanylmethyl acrylate residue, 3-ethyl-3-oxetanylmethyl methacrylate residue, tetrahydrofurfuryl acrylate residue and tetrahydrofurfuryl methacrylate residue are preferably used in that a fumaric diester copolymer having excellent heat resistance and transparency is obtained.

Composition ratio of the fumaric diester residue unit represented by the general formula (1) to at least one (meth)acrylic ester residue unit selected from the (meth)acrylic ester residue unit having an oxetanyl group represented by the general formula (2) and the (meth)acrylic ester residue unit having a tetrahydrofurfuryl group represented by the general formula (3) in the fumaric diester copolymer of the present invention can be any ratio so long as the fumaric diester copolymer of the present invention is obtained. From that a fumaric diester copolymer having excellent heat resistance and transparency is obtained, it is preferable that the proportion of the fumaric diester residue unit is from 50 to 99 mol %, and the proportion of at least one (meth)acrylic ester residue unit selected from the (meth)acrylic ester residue unit having an oxetanyl group and the (meth)acrylic ester residue unit having a tetrahydrofurfuryl group is from 50 to 1 mol %. It is particularly preferable that the proportion of the fumaric diester residue unit is from 80 to 99 mol %, and the proportion of at least one (meth)acrylic ester residue unit selected from the (meth)acrylic ester residue unit having an oxetanyl group and the (meth)acrylic ester residue unit having a tetrahydrofurfuryl group is from 20 to 1 mol %.

The fumaric diester copolymer of the present invention has a number average molecular weight calculated in terms of polystyrene measured by a gel permeation chromatography of from 1,000 to 500,000, and preferably from 10,000 to 100,000. Where the number average molecular weight is less than 1,000, the fumaric diester copolymer is insufficient in strength. On the other hand, where the number average molecular weight exceeds 500,000, the fumaric diester copolymer has high viscosity, resulting in poor handleability.

A method for producing the fumaric diester copolymer of the present invention can use any production methods so long as the fumaric diester copolymer comprising the fumaric diester residue unit represented by the general formula (1) to at least one (meth)acrylic ester residue unit selected from the (meth)acrylic ester residue unit having an oxetanyl group represented by the general formula (2) and the (meth)acrylic ester residue unit having a tetrahydrofurfuryl group represented by the general formula (3) is obtained. Of those methods, a method comprising radically copolymerizing a fumaric diester represented by the following general formula (4) with at least one (meth)acrylic ester selected from a (meth)acrylic ester having an oxetanyl group represented by the following general formula (5) and a (meth)acrylic ester having a tetrahydrofurfuryl group represented by the following general formula (6) is preferably used from that the fumaric diester copolymer can easily be obtained,

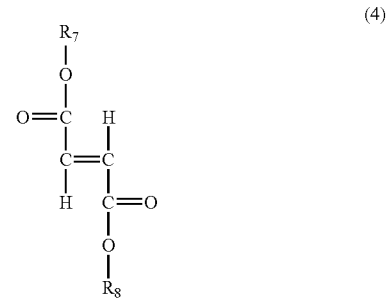

(wherein $R_7$ and $R_8$ each independently represents a linear alkyl group having from 1 to 6 carbon atoms, a branched alkyl group having from 1 to 6 carbon atoms, or a cyclic alkyl group having from 3 to 6 carbon atoms,)

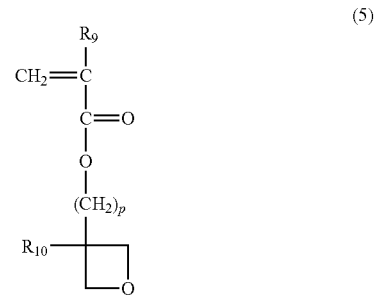

(wherein $R_9$ represents hydrogen or methyl group, $R_{10}$ represents hydrogen, a linear alkyl group having from 1 to 4 carbon atoms, or a branched alkyl group having from 1 to 4 carbon atoms, and p is 1 or 2,)

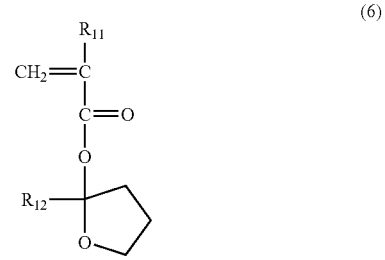

(wherein $R_{11}$ represents hydrogen or methyl group, $R_{12}$ represents hydrogen, a linear alkyl group having from 1 to 4 carbon atoms, or a branched alkyl group having from 1 to 4 carbon atoms.)

$R_7$ and $R_8$ in the fumaric diester represented by the general formula (4) used in the method for producing the fumaric diester copolymer of the present invention each independently represents a linear alkyl group having from 1 to 6 carbon atoms, a branched alkyl group having from 1 to 6 carbon atoms, or a cyclic alkyl group having from 3 to 6 carbon atoms. Examples of the linear alkyl group having from 1 to 6 carbon atoms include methyl group, ethyl group, propyl group, n-butyl group, pentyl group, and hexyl group. Examples of the branched alkyl group having from 1 to 6 carbon atoms include isopropyl group, isobutyl group, sec-butyl group, and tert-butyl group. Examples of the cyclic alkyl group having from 3 to 6 carbon atoms include cyclopropyl group, cyclobutyl group, and cyclohexyl group. Of those, isopropyl group, tert-butyl group, and cyclohexyl group are preferable, and isopropyl group is more preferable, from that the fumaric diester copolymer is easily obtained.

Examples of the fumaric diester represented by the general formula (4) include dimethyl fumarate, diethyl fumarate, dipropyl fumarate, di-n-butyl fumarate, dipentyl fumarate, dihexyl fumarate, diisopropyl fumarate, diisobutyl fumarate, di-sec-butyl fumarate, di-tert-butyl fumarate, dicyclopropyl fumarate, dicyclobutyl fumarate, and dicyclohexyl fumarate. Of those, diisopropyl fumarate, di-tert-butyl fumarate, and dicyclohexyl fumarate are preferable, and diisopropyl fumarate is more preferable.

In the (meth)acrylic ester having an oxetanyl group represented by the general formula (5) used in the method for producing the fumaric diester copolymer of the present invention, $R_9$ is hydrogen or methyl group, $R_{10}$ is hydrogen, a linear alkyl group having from 1 to 4 carbon atoms, or a branched alkyl group having from 1 to 4 carbon atoms, and p is 1 or 2. In $R_{10}$, examples of the linear alkyl group having from 1 to 4 carbon atoms include methyl group, ethyl group, propyl group, and n-butyl group, and examples of the branched alkyl group having from 1 to 4 carbon atoms include isopropyl group, isobutyl group, sec-butyl group, and tert-butyl group.

Examples of the (meth)acrylic ester having an oxetanyl group represented by the general formula (5) include 3-oxetanylmethyl acrylate, 3-methyl-3-oxetanylmethyl acrylate, 3-ethyl-3-oxetanylmethyl acrylate, 3-propyl-3-oxetanylmethyl acrylate, 3-n-butyl-3-oxetanylmethyl acrylate, 3-isopropyl-3-oxetanylmethyl acrylate, 3-isobutyl-3-oxetanylmethyl acrylate, 3-sec-butyl-3-oxetanylmethyl acrylate, 3-tert-butyl-3-oxetanylmethyl acrylate, 3-oxetanylethyl acrylate, 3-methyl-3-oxetanylethyl acrylate, 3-ethyl-3-oxetanylethyl acrylate, 3-propyl-3-oxetanylethyl acrylate, 3-n-butyl-3-oxetanylethyl acrylate, 3-isopropyl-3-oxetanylethyl acrylate, 3-isobutyl-3-oxetanylethyl acrylate, 3-sec-butyl-3-oxetanylethyl acrylate, 3-tert-butyl-3-oxetanylethyl acrylate, 3-oxetanylmethyl methacrylate, 3-methyl-3-oxetanylmethyl methacrylate, 3-ethyl-3-oxetanylmethyl methacrylate, 3-propyl-3-oxetanylmethyl methacrylate, 3-n-butyl-3-oxetanylmethyl methacrylate, 3-isopropyl-3-oxetanylmethyl methacrylate, 3-isobutyl-3-oxetanylmethyl methacrylate, 3-sec-butyl-3-oxetanylmethyl methacrylate, 3-tert-butyl-3-oxetanylmethyl methacrylate, 3-oxetanylethyl methacrylate, 3-methyl-3-oxetanylethyl methacrylate, 3-ethyl-3-oxetanylethyl methacrylate, 3-propyl-3-oxetanylethyl methacrylate, 3-n-butyl-3-oxetanylethyl methacrylate, 3-isopropyl-3-oxetanylethyl methacrylate, 3-isobutyl-3-oxetanylethyl methacrylate, 3-sec-butyl-3-oxetanylethyl methacrylate, and 3-tert-butyl-3-oxetanylethyl methacrylate. Of those, 3-ethyl-3-oxetanylmethyl acrylate, and 3-ethyl-3-oxetanylmethyl methacrylate are preferably used.

In the (meth)acrylic ester having a tetrahydrofurfuryl group represented by the general formula (6) used in the method for producing the fumaric diester copolymer of the present invention, $R_{11}$ is hydrogen or methyl group, and $R_{12}$ is hydrogen, a linear alkyl group having from 1 to 4 carbon atoms, or a branched alkyl group having from 1 to 4 carbon atoms. In $R_{12}$, examples of the linear alkyl group having from 1 to 4 carbon atoms include methyl group, ethyl group, propyl group, and n-butyl group, and examples of the branched alkyl group having from 1 to 4 carbon atoms include isopropyl group, isobutyl group, sec-butyl group, and tert-butyl group.

Examples of the (meth)acrylic ester having a tetrahydrofurfuryl group represented by the general formula (6) include tetrahydrofurfuryl acrylate, 2-methyltetrahydrofurfuryl acrylate, 2-ethyltetrahydrofurfuryl acrylate, 2-propyltetrahydrofurfuryl acrylate, 2-n-butyltetrahydrofurfuryl acrylate, 2-isopropyltetrahydrofurfuryl acrylate, 2-isobutyltetrahydrofurfuryl acrylate, 2-sec-butyltetrahydrofurfuryl acrylate, 2-tert-butyltetrahydrofurfuryl acrylate, tetrahydrofurfuryl methacrylate, 2-methyltetrahydrofurfuryl methacrylate, 2-ethyltetrahydrofurfuryl methacrylate, 2-propyltetrahydrofurfuryl methacrylate, 2-n-butyltetrahydrofurfuryl methacrylate, 2-isopropyltetrahydrofurfuryl methacrylate, 2-isobutyltetrahydrofurfuryl methacrylate, 2-sec-butyltetrahydrofurfuryl methacrylate, and 2-tert-butyltetrahydrofurfuryl methacrylate. Of those, tetrahydrofurfuryl acrylate and tetrahydrofurfuryl methacrylate are preferably used.

A method for producing the fumaric diester copolymer of the present invention by radical copolymerization of the fumaric diester represented by the general formula (4) with at least one (meth)acrylic ester selected from the (meth)acrylic ester having an oxetanyl group represented by the general formula (5) and the (meth)acrylic ester having a tetrahydrofurfuryl group represented by the general formula (6) is not particularly limited, and the fumaric diester copolymer of the present invention can be produced by the conventional radical copolymerization methods. Examples of the method that can be used include a suspension copolymerization method using a suspending agent in an aqueous medium, an emulsion copolymerization method, a solution copolymerization method using an organic solvent such as toluene, and a bulk copolymerization method without a solvent.

Examples of a polymerization initiator that is used in conducting the radical copolymerization include organic peroxides such as benzoyl peroxide, lauryl peroxide, octanoyl peroxide, acetyl peroxide, di-tert-butyl peroxide, tert-butylcumyl peroxide, dicumyl peroxide, tert-butyl peroxyacetate, tert-butylperoxybenzoate and tert-butylperoxybutyl pivalate; and azo-based initiators such as 2,2'-azobis(2,4-dimethylvaleronitrile), 2,2'-azobis(2-butyronitrile), 2,2'-azobisisobutyronitrile, dimethyl-2,2'-azobisisobutyrate, and 1,1'-azobis(cyclohexane-1-carbonitrile).

A solvent used in conducting the radical copolymerization is not particularly limited. Examples of the solvent that can be used include aromatic solvents such as benzene, toluene and xylene; alcohol-based solvents such as methanol, ethanol, propyl alcohol and butyl alcohol; cyclohexane; dioxane; tetrahydrofuran; acetone; methyl ethyl ketone; dimethyl formamide; isopropyl acetate; and water. Mixed solvents of those can also be used.

Polymerization temperature in conducting the radical copolymerization can appropriately be set depending on decomposition temperature of the polymerization initiator used. In general, the radical copolymerization is preferably conducted at a temperature in a range of from 40 to 150° C.

The fumaric diester copolymer of the present invention may contain other monomer residue units in the range that the present invention does not deviate from the object thereof. Examples of the other monomer residue units that may be contained include olefin residues such as ethylene residue, propylene residue, and 1-butene residue; acrylic acid alkyl ester residues such as methyl acrylate residue, ethyl acrylate residue, and butyl acrylate residue; methacrylic acid alkyl ester residues such as methyl methacrylate residue, ethyl methacrylate residue, and butyl methacrylate residue; vinyl aromatic hydrocarbon residues such as styrene residue, and α-methylstyrene residue; carboxylic acid vinyl ester residues such as vinyl acetate residue, vinyl propionate residue, and vinyl pivalate residue; vinyl ether residues such as methyl vinyl ether residue, ethyl vinyl ether residue, and butyl vinyl ether residue; N-substituted maleimide residues such as N-methyl maleimide residue, N-cyclohexyl maleimide residue, and N-phenyl maleimide residue; acrylonitrile residue; and methacrylonitrile residue.

From that the fumaric diester copolymer of the present invention has further excellent dimensional stability and chemical resistance, the fumaric diester copolymer is preferably crosslinked to form a crosslinked product of the fumaric diester copolymer. In particular, it is more preferable that at least one of an oxetanyl group and a tetrahydrofurfuryl group in the fumaric diester copolymer is ring-opened to form a crosslinked product of the fumaric diester copolymer. The method of forming the crosslinked product can use any method so long as a crosslinked product of the fumaric diester copolymer is obtained. Of those methods, a method of producing a crosslinked product of the fumaric diester copolymer by adding a crosslinking accelerator to the fumaric diester copolymer, and then irradiating the resulting mixture with light is preferably used in that the crosslinked product can easily be obtained. Examples of such a method that can be used include a method of dissolving the fumaric diester copolymer and the crosslinking accelerator in a solvent, and irradiating such a mixture in a dissolved state with light; and a method of melting the fumaric diester copolymer and the crosslinking accelerator in a solvent, forming a molding such as a film, and then irradiating the molding with light to form a crosslinked product.

The crosslinking accelerator used in forming a crosslinked product is not particularly limited so long as it is a crosslinking accelerator, and can use the conventional crosslinking accelerators. Examples of the crosslinking accelerator that can be used include aromatic diazonium salts such as phenyl diazonium hexafluoroantimonate, phenyl diazonium hexafluorophosphate, and phenyl diazonium tetrafluoroborate; aromatic iodonium salts such as diphenyl iodonium hexafluoroantimonate, diphenyl iodonium hexafluorophosphate, and diphenyl iodonium tetrafluoroborate; aromatic sulfonium salts such as triphenyl sulfonium hexafluoroantimonate, triphenyl hexafluorophosphate, and triphenyl sulfonium tetrafluoroborate; (2,4-cyclopentadien-1-yl)[(1-methyl-ethyl)benzene-iron complexes; and o-nitrobenzylsilyl ether-aluminum complexes. The amount of the crosslinking accelerator added is preferably from 0.1 to 10 g, and more preferably from 0.2 to 5 g, per 100 g of the fumaric diester copolymer.

Light used in forming a crosslinked product is not particularly limited, and examples of the light source thereof include a mercury lamp, a metal halide lamp, and an excimer lamp.

The fumaric diester copolymer of the present invention is a novel fumaric diester copolymer having heat resistance and transparency, and can be used as various molding materials for films, sheets, injected moldings and the like.

The crosslinked product of a fumaric diester copolymer, obtained by crosslinking the fumaric diester copolymer of the present invention can be used for various moldings such as films, sheets and moldings, and are preferably used for films, in particular optical films, further optical films for display.

The optical film for display comprising the crosslinked product of a fumaric diester copolymer, obtained by crosslinking the fumaric diester copolymer has a thickness in a range of preferably from 10 to 700 µm, particularly preferably from 50 to 500 µm, and further preferably from 100 to 300 µm.

The optical film for display has a gel fraction, measured from a tetrahydrofuran insoluble content, of preferably 10% or higher, particularly preferably 30% or higher, and further preferably 50% or higher. The term "gel fraction" used herein is represented as a measure of the degree of crosslinking of an optical film for display.

A method for producing the optical film for display can use any methods so long as an optical film for display is obtained. Examples of such a method include a production method comprising forming a film of the fumaric diester copolymer of the present invention and crosslinking the film to form a crosslinked film, and a production method comprising crosslinking the fumaric diester copolymer of the present invention and forming a crosslinked film thereof. Of those methods, the production method comprising forming a film of the fumaric diester copolymer and crosslinking the film to form a crosslinked film is preferably used from that an optical film for display having excellent quality can be produced.

A method for forming the fumaric diester of the present invention into a film can use any methods such as a melt extrusion method and a solution casting method, that are generally known as a production method of a film. Of those methods, a method for producing a film by a solution casting method is preferably used from that films or optical films for display having particularly excellent optical properties, heat resistance and surface properties can be obtained.

The solution casting method is a method of obtaining a film by flow casting a resin solution (generally called "dope") on a supporting substrate, and evaporating the solvent by heating. Examples of the flow casting method used include a T die method, a doctor blade method, a bar coater method, a roll coater method, and a lip coater method. Industrially, a method of continuously extruding a dope from a die on a belt-shaped or drum-shaped supporting substrate is most generally used. Examples of the supporting substrate used include glass substrates; metal substrates such as stainless steel and ferro type steel; and plastic substrates such as polyethylene terephthalate. To industrially and continuously form optical films having highly excellent surface properties and optical homogeneity, a metal substrate having a mirror-polished surface is preferably used.

Examples of the method for forming a crosslinked film can include a method of conducting crosslinking with electron beams, light and/or heat.

As the method of crosslinking with electron beams, the general electron beam irradiation devices can be used. In this case, crosslinking assistants such as polyfunctional vinyl compounds (e.g., trimethylpropane triacrylate and triallyl cyanurate) are preferably used in order to make the reaction efficiency of crosslinking more excellent. When crosslinking is conducted with electron beams, the irradiation intensity of electron beams is preferably from 5 to 500 kGy, and particularly preferably from 10 to 100 kGy. The crosslinking with such electron beams is particularly excellent in crosslinking efficiency, and therefore gives an optical film for display having excellent heat resistance.

Example of the method of crosslinking with light includes a method of using a mercury lamp, a metal halide lamp, an excimer lamp or the like as a light source, and example of the method of crosslinking with heat includes a method of simply heating.

In forming a crosslinked film, crosslinking accelerators are preferably used from that further uniform crosslinking and crosslinking efficiency become possible, and an optical film for display having excellent quality is obtained. Examples of the crosslinking accelerator that can be used include aromatic diazonium salts such as phenyl diazonium hexafluoroantimonate, phenyl diazonium hexafluorophosphate, and phenyl diazonium tetrafluoroborate; aromatic iodonium salts such as diphenyl iodonium hexafluoroantimonate, diphenyl iodonium hexafluorophosphate, and diphenyl iodonium tetrafluoroborate; aromatic sulfonium salts such as triphenyl sulfonium hexafluoroantimonate, triphenyl hexafluorophosphate, and triphenyl sulfonium tetrafluoroborate; aromatic ammonium salts such as 1-benzyl-2-cyanopyridium hexafluoroantimonate, 1-benzyl-2-cyanopyridium hexafluorophosphate, and 1-benzyl-2-cyanopyridium tetrafluoroborate; aromatic phosphonium salts such as ethyl triphenyl phosphonium tetrafluoroantimonate; (2,4-cyclopentadien-1-yl)[(1-methylethyl)benzene-iron complexes; and o-nitrobenzylsilyl ether-aluminum complexes. The amount of the crosslinking accelerator added is preferably from 0.1 to 10 parts by weight, and particularly preferably from 0.2 to 5 parts by weight, per 100 parts by weight of the fumaric diester copolymer.

The optical film for display has a total light transmittance of preferably 85% or higher, and more preferably 90% or higher, in order that it becomes an optical film for display having particularly excellent transparency and quality. The optical film for display has a light transmittance to light of 400 nm of preferably 80% or higher, particularly preferably 85% or higher and further preferably 90% or higher. Further, the optical film for display has a haze of preferably 2% or lower, and particularly preferably 1% or lower.

In addition, the optical film for display has a retardation measured from the film front of preferably 10 nm or less, and particularly preferably 5 nm or less, in order that it is used as an optical film for display having excellent visual quality. Retardation unevenness within the film plane is preferably 5 nm or less, and particularly preferably 3 nm or less. The film preferably has a uniform thickness, and the thickness unevenness is preferably 10 μm or less, particularly preferably 5 μm or less, and further preferably 3 μm or less.

The optical film for display preferably further comprises at least one gas barrier layer laminated thereon in order to protect the display from deterioration by moisture or oxidation in an air atmosphere. Examples of the gas barrier layer include layers of inorganic materials such as silicon oxide, silicon nitride, silicon nitric oxide, aluminum oxide, tantalum oxide and aluminum; layers of organic materials such as polyvinyl alcohol and polyolefins. Inorganic material layers are preferable in that an optical film for display having excellent optical properties, gas barrier performance, and dimensional stability which is important for high definition display is obtained. In particular, silicon oxide, silicon nitride and silicon nitric oxide are preferably used. The gas barrier layer has a thickness of preferably from 1 to 1,000 nm, and particularly preferably from 10 to 300 nm, in the case of an inorganic film, and a thickness of preferably from 0.1 to 100 μm, and particularly preferably from 1 to 50 μm, in the case of an organic layer. Those gas barrier layers can be a multilayer by laminating organic layers and inorganic layers. The gas barrier layer can be formed by the conventional method such as vapor deposition, sputtering, PECVD, CatCVD, coating and laminating.

The optical film for display is preferably a film having at least one hard coat layer thereon in order to improve surface property of the film, scratch resistance, chemical resistance when forming TFT. Examples of the hard coat layer include layers comprising silicone-based resins, acrylic resins, acrylic silicone-based resins, ultraviolet curing resins, urethane-based hard coat agents. Those can be used alone or as mixtures of two or more thereof. Of those, a hard coat layer comprising an ultraviolet curing coating agent is preferable from that an optical film for display having excellent transparency, scratch resistance and chemical resistance is obtained. Examples of the ultraviolet curing coating agent include ultraviolet curing urethane acrylates, ultraviolet curing epoxy acrylates, ultraviolet curing (poly)ester acrylates, and ultraviolet curing oxetanes. The hard coat layer has a thickness of preferably from 0.1 to 100 μm, particularly preferably from 1 to 50 μm, and further preferably from 2 to 20 μm.

The optical film for display may undergo a primer treatment between the optical film for display and a gas barrier layer and/or a hard coat layer.

The optical film for display may contain antioxidants and light stabilizers for the purpose of improving heat stability or light stability of the film. Examples of the antioxidant include hindered phenolic antioxidants, phosphorus-based antioxidants, sulfur-based antioxidants, lactone-based antioxidants, amine-based antioxidants, hydroxylamine-based antioxidants, vitamin E-based antioxidants, and other antioxidants. Examples of the light stabilizer include hindered amine-based light stabilizers. Those antioxidants and light stabilizers may respectively be used alone or as mixtures of two or more thereof.

The optical film for display may further contain ultraviolet absorbers for the purpose of preventing a liquid crystal compound from deterioration. Examples of the ultraviolet absorber that can be added if desired and necessary include benzotriazole, benzophenone, triazine and benzoate. Those ultraviolet absorbers can be used alone or as mixtures of two or more thereof.

The optical film for display may further contain other polymers, surfactants, polyelectrolytes, conductive complexes, inorganic fillers, pigments, dyes, antistatic agents, anti-blocking agents, lubricants, and the like in the range such that the object of the present invention does not deviate.

The optical film for display can be used as a protective film for polarizing plate, a retardation film, a touch panel film, a film substrate for flat panel display, and a plastic film substrate for liquid crystal display.

The optical film for display is used as a protective film for polarizing plate such that the optical film is laminated on at least one side of a polyvinyl alcohol/iodine-based polarizing plate for the purpose of protecting the surface of the polarizing plate.

The retardation film can be produced by uniaxially or biaxially stretching the optical film for display. As the stretching method, the conventional uniaxial stretching methods can be used. Examples of the conventional uniaxial stretching method include a method of stretching with a tenter, a method of stretching by rolling with a calender, a method of stretching between rolls, a free-width uniaxial stretching method, and a fixed-width uniaxial stretching method. Examples of the biaxial stretching method include a method of stretching with a tenter, a successive biaxial stretching method and a simultaneous biaxial stretching method.

When the optical film for display is used as a touch panel film, it is used as a film for constituting a touch panel display. The use method is not particularly limited. For example, in the case of a resistance type touch panel, a transparent conductive film is formed on the optical film for display, and such a laminate film can be used as an upper electrode substrate or a lower electrode substrate.

The optical film for display has excellent heat resistance, and therefore can be used as a film substrate for flat panel display, particularly a plastic film substrate for liquid crystal display. A color filter is formed on the film substrate by the conventional method such as a photolithography method, a printing method or an electrodeposition method. TFT can be formed on the film substrate by the conventional technology, such as a method as described in S.I.D.O. 3 Digest p-992 (2003).

The present invention can provide a novel fumaric diester copolymer having excellent heat resistance and transparency.

The present invention is described in more detail by reference to the following Examples, but it should be understood that the invention is not construed as being limited thereto. Evaluation and measurement methods of the fumaric diester copolymers obtained in the Examples are shown below. Unless otherwise indicated, reagents used are the commercially available products.

Number Average Molecular Weight:

Determined by using a gel permeation chromatography (GPC) apparatus (HLC-802A, a product of Tosoh Corporation), measuring at 40° C. using chloroform as a solvent, and calculating in terms of a standard polystyrene conversion.

Composition of Fumaric Diester Copolymer:

Determined from a proton nuclear magnetic resonance spectroanalysis ($^1$H-NMR) using a nuclear magnetic resonance measurement device (trade name: JNM-GX270, a product of JEOL Co.).

Evaluation Method of Transparency:

To evaluate transparency, a sheet having a thickness of 300 μm was prepared by a solution casting method using tetrahydrofuran as a solvent, and a total light transmittance and a haze were measured with a haze meter (trade name: NDH2000, a product of Nippon Denshoku Co.).

Evaluation Method of Heat Resistance:

Heat resistance of the fumaric diester copolymer was determined by maintaining a sheet used for evaluation of transparency in an oven at 150° C. for 1 hour, and visually observing discoloration and deformation of the sheet. The criterion of judgment was that the case of observing no discoloration and deformation was shown "o", and the case of observing discoloration and deformation was shown "x".

Heat resistance of the crosslinked film was determined by maintaining the sheet in an oven at 220° C. for 1 hour, and visually observing discoloration and deformation of the sheet. The criterion of judgment was that the case of observing no discoloration and deformation was shown "o", and the case of observing discoloration and deformation was shown "x".

Measurement of Gel Fraction

Weight of the crosslinked film was measured, a dissolved material was extracted with a Soxhlet extraction method (solvent: tetrahydrofuran, reflux for 3 hours), and weight of the dissolved matter was measured. Weight of the undissolved matter was determined by subtracting the weight of the dissolved matter from the weight of crosslinked film.

The gel fraction was determined by the following equation.

Gel fraction (%)=Weight of undissolved matter/ Weight of crosslinked film×100

Measurement Retardation Amount:

A retardation amount was measured by a polarization microscope (Senarmont compensation process) using a Senarmont compensator described in *Primer of Polarization Microscope of Polymer Materials* (written by Hiroshi Awaya and published by Agune Gijusu Center, Chapter 5, pp. 78-82 (2001)).

Evaluation Method of Dimensional Stability:

Marks were drawn at four corners of a 100 mm square on a film used for the evaluation of transparency. The film was sandwiched between two glass plates, and the respective distance of four marked points was measured with a precision coordinate meter. The film was then maintained in an oven at 220° C. for 1 hour. The film was taken out of the oven and was allowed to stand to cool to room temperature. The respective distance of four marked points on the film was again measured, and dimensional change before and after heating was determined by the following equation.

Dimensional change (%)=(Dimension before heating− dimension after heating)/(Dimension before heating)×100

Measurement of surface hardness:

Surface hardness was measured in terms of a scratch pencil hardness according to JIS K5600-5-4 (1996).

EXAMPLE 1

0.4 g of polyvinyl alcohol (molecular weight: 2,000, degree of saponification: 80%), 260 g of a distilled water, 122 g (0.609 mol) of diisopropyl fumarate, 18 g (0.106 mol) of 3-ethyl-3-oxetanylmethyl acrylate, and 0.8 g (0.005 mol) of tert-butylperoxypivalate as a polymerization initiator were placed in a 500 ml four-necked flask equipped with a stirrer, a condenser, a nitrogen inlet pipe and a thermometer, and bubbling was conducted with nitrogen for 1 hour. The resulting mixture was maintained at 50° C. for 24 hours while stirring at 550 rpm, thereby conducting a radical copolymerization. After completion of the copolymerization reaction, the polymeric product in the flask was filtered off, and washed with a distilled water and methanol to obtain a copolymer (yield: 53%). It was confirmed by $^1$H-NMR measurement (FIG. 1) that the copolymer obtained was a fumaric diester copolymer having diisopropyl fumarate residue unit/3-ethyl-3-oxetanylmethyl acrylate residue unit=86/14 (mol %). The fumaric diester copolymer obtained had a number average molecular weight of 81,000.

The fumaric diester copolymer obtained was evaluated on heat resistance and transparency. The results obtained are shown in Table 1 below.

EXAMPLE 2

0.4 g of polyvinyl alcohol (molecular weight: 2,000, degree of saponification: 80%), 260 g of a distilled water, 137.5 g (0.687 mol) of diisopropyl fumarate, 2.5 g (0.015 mol) of 3-ethyl-3-oxetanylmethyl acrylate, and 0.8 g (0.005 mol) of tert-butylperoxypivalate as a polymerization initiator were placed in a 500 ml four-necked flask equipped with a stirrer, a condenser, a nitrogen inlet pipe and a thermometer, and bubbling was conducted with nitrogen for 1 hour. The resulting mixture was maintained at 50° C. for 24 hours while stirring at 550 rpm, thereby conducting a radical copolymerization. After completion of the copolymerization reaction, the polymeric product in the flask was filtered off, and washed with a distilled water and methanol to obtain a copolymer (yield: 82%). It was confirmed by $^1$H-NMR measurement that the copolymer obtained was a fumaric diester copolymer having diisopropyl fumarate residue unit/3-ethyl-3-oxetanylmethyl acrylate residue unit=96/4 (mol %). The fumaric diester copolymer obtained had a number average molecular weight of 47,000.

The fumaric diester copolymer obtained was evaluated in the same manner as in Example 1. The results obtained are shown in Table 1 below.

EXAMPLE 3

Figure 2:
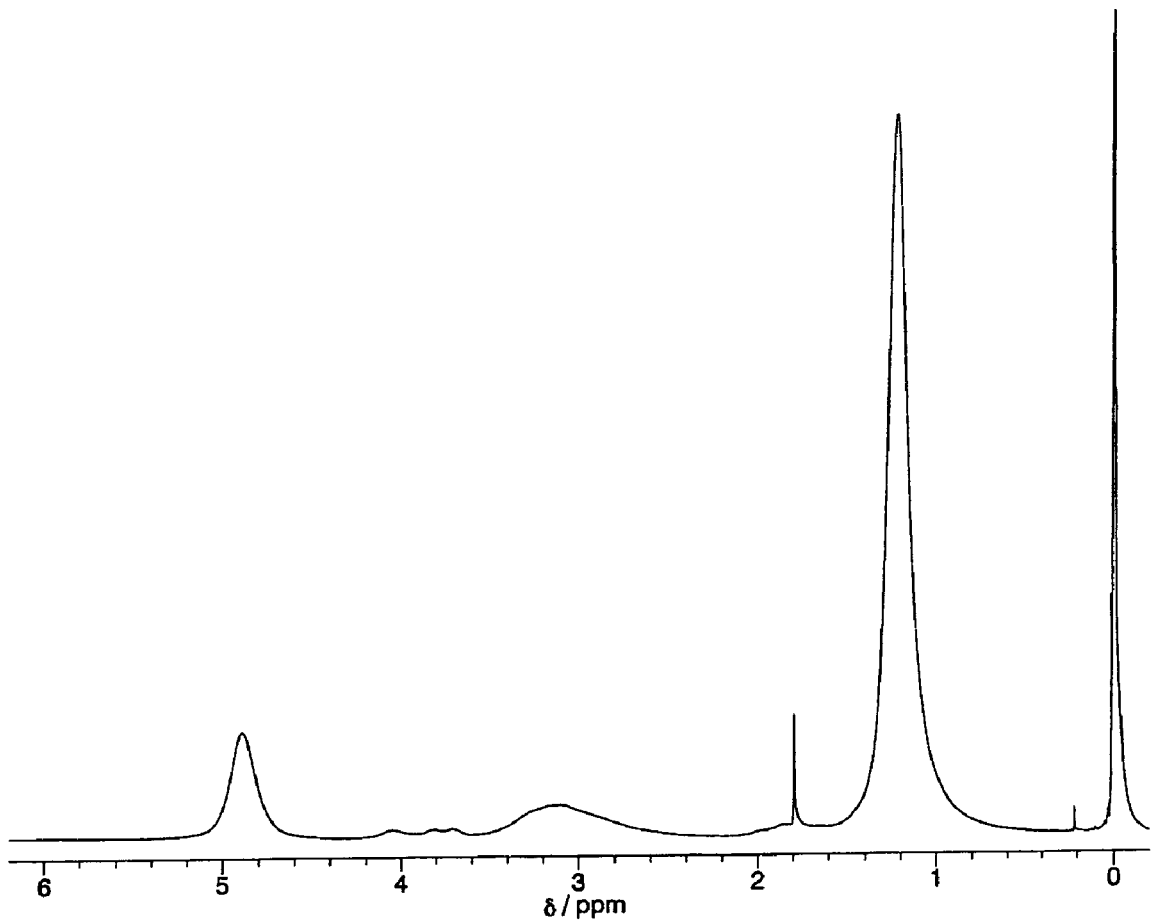
FIG. 2 is $^1$H-NMR spectrum in $CDCl_3$ of the fumaric diester copolymer obtained in Example 3.

0.4 g of polyvinyl alcohol (molecular weight: 2,000, degree of saponification: 80%), 260 g of a distilled water, 134 g (0.669 mol) of diisopropyl fumarate, 6 g (0.038 mol) of tetrahydrofurfuryl acrylate, and 1.1 g (0.006 mol) of tert-butylperoxypivalate as a polymerization initiator were placed in a 500 ml four-necked flask equipped with a stirrer, a condenser, a nitrogen inlet pipe and a thermometer, and bubbling was conducted with nitrogen for 1 hour. The resulting mixture was maintained at 50° C. for 24 hours while stirring at 550 rpm, thereby conducting a radical copolymerization. After completion of the copolymerization reaction, the polymeric product in the flask was filtered off, and washed with a distilled water and methanol to obtain a copolymer (yield: 60%). It was confirmed by $^1$H-NMR measurement (FIG. 2) that the copolymer obtained was a fumaric diester copolymer having diisopropyl fumarate residue unit/tetrahydrofurfuryl acrylate residue unit=95/5 (mol %). The fumaric diester copolymer obtained had a number average molecular weight of 40,000.

The fumaric diester copolymer obtained was evaluated in the same manner as in Example 1. The results obtained are shown in Table 1 below.

EXAMPLE 4

0.4 g of polyvinyl alcohol (molecular weight: 2,000, degree of saponification: 80%), 260 g of a distilled water, 103 g (0.514 mol) of diisopropyl fumarate, 37 g (0.212 mol) of tetrahydrofurfuryl acrylate, and 0.8 g (0.005 mol) of tert-butylperoxypivalate as a polymerization initiator were placed in a 500 ml four-necked flask equipped with a stirrer, a condenser, a nitrogen inlet pipe and a thermometer, and bubbling was conducted with nitrogen for 1 hour. The resulting mixture was maintained at 50° C. for 24 hours while stirring at 550 rpm, thereby conducting a radical copolymerization. After completion of the copolymerization reaction, the polymeric product in the flask was filtered off, and washed with a distilled water and methanol to obtain a copolymer (yield: 65%). It was confirmed by $^1$H-NMR measurement that the copolymer obtained was a fumaric diester copolymer having diisopropyl fumarate residue unit/tetrahydrofurfuryl acrylate residue unit=64/36 (mol %). The fumaric diester copolymer obtained had a number average molecular weight of 50,000.

The fumaric diester copolymer obtained was evaluated in the same manner as in Example 1. The results obtained are shown in Table 1 below.

EXAMPLE 5

0.4 g of polyvinyl alcohol (molecular weight: 2,000, degree of saponification: 80%), 260 g of a distilled water, 115 g (0.574 mol) of diisopropyl fumarate, 25 g (0.136 mol) of 3-ethyl-3-oxetanylmethyl methacrylate, and 0.8 g (0.005 mol) of tert-butylperoxypivalate as a polymerization initiator were placed in a 500 ml four-necked flask equipped with a stirrer, a condenser, a nitrogen inlet pipe and a thermometer, and bubbling was conducted with nitrogen for 1 hour. The resulting mixture was maintained at 50° C. for 24 hours while stirring at 550 rpm, thereby conducting a radical copolymerization. After completion of the copolymerization reaction, the polymeric product in the flask was filtered off, and washed with a distilled water and methanol to obtain a copolymer (yield: 55%). It was confirmed by $^1$H-NMR measurement that the copolymer obtained was a fumaric diester copolymer having diisopropyl fumarate residue unit/3-ethyl-3-oxetanylmethyl methacrylate residue unit=80/20 (mol %). The fumaric diester copolymer obtained had a number average molecular weight of 120,000.

The fumaric diester copolymer obtained was evaluated in the same manner as in Example 1. The results obtained are shown in Table 1 below.

EXAMPLE 6

0.4 g of polyvinyl alcohol (molecular weight: 2,000, degree of saponification: 80%), 260 g of a distilled water, 130 g (0.649 mol) of diisopropyl fumarate, 10 g (0.059 mol) of tetrahydrofurfuryl methacrylate, and 0.8 g (0.005 mol) of tert-butylperoxypivalate as a polymerization initiator were placed in a 500 ml four-necked flask equipped with a stirrer, a condenser, a nitrogen inlet pipe and a thermometer, and bubbling was conducted with nitrogen for 1 hour. The resulting mixture was maintained at 50° C. for 24 hours while stirring at 550 rpm, thereby conducting a radical copolymerization. After completion of the copolymerization reaction, the polymeric product in the flask was filtered off, and washed with a distilled water and methanol to obtain a copolymer (yield: 60%). It was confirmed by $^1$H-NMR measurement that the copolymer obtained was a fumaric diester copolymer having diisopropyl fumarate residue unit/tetrahydrofurfuryl methacrylate residue unit=90/10 (mol %). The fumaric diester copolymer obtained had a number average molecular weight of 50,000.

The fumaric diester copolymer obtained was evaluated in the same manner as in Example 1. The results obtained are shown in Table 1 below.

TABLE 1

|  | Evaluation of transparency | | Evaluation of heat resistance |
|---|---|---|---|
|  | Total light transmittance | Haze |  |
| Example 1 | 93% | 1.3% | ○ |
| Example 2 | 93% | 1.0% | ○ |
| Example 3 | 93% | 1.0% | ○ |
| Example 4 | 93% | 1.2% | ○ |
| Example 5 | 93% | 1.3% | ○ |
| Example 6 | 93% | 1.3% | ○ |

EXAMPLES 7 TO 12

30 g of the fumaric diester copolymer obtained in each of Examples 1 to 6 and 0.5 g of diphenyl iodonium hexafluorophosphate were dissolved in tetrahydrofuran. Using the resulting solution, a sheet having a thickness of 300 μm was obtained by a solution casting method. The sheet was irradiated with a mercury lamp for 10 minutes. As a result, the film obtained was insoluble in a solvent such as tetrahydrofuran and toluene. It was confirmed from this fact that the film was a crosslinked product composed of a fumaric diester copolymer. The crosslinked product was evaluated on transparency. The results obtained are shown in Table 2 below. In the same heat resistance evaluation as in Example 1, each of the crosslinked products did not show discoloration and deformation, and thus was good.

TABLE 2

|  | Evaluation of transparency | |
|---|---|---|
|  | Total light transmittance | Haze |
| Example 7 | 93% | 1.3% |
| Example 8 | 93% | 1.0% |
| Example 9 | 93% | 1.0% |
| Example 10 | 93% | 1.2% |

TABLE 2-continued

| | Evaluation of transparency | |
|---|---|---|
| | Total light transmittance | Haze |
| Example 11 | 93% | 1.3% |
| Example 12 | 93% | 1.3% |

EXAMPLE 13

100 parts by weight of the fumaric diester copolymer obtained in Example 1, 1.5 parts by weight of diphenyl iodonium hexafluorophosphate and 400 parts by weight of tetrahydrofuran were mixed to prepare a 20 wt % solution. 0.35 part by weight of pentaerythritoltetrakis(3-(3,5-di-t-butyl-4-hydroxyphenyl)propionate) and 1.05 parts by weight of bis(2,6-di-t-butyl-4-methylphenyl)pentaerythritol diphosphite were added to the solution obtained above to prepare a solution.

The solution thus obtained was flow cast on a polyethylene terephthalate film using a bar coater and then the solvent was removed by heating at 100° C. to produce a fumaric diester copolymer film having a thickness of 140 μm and a thickness unevenness of 2 μm.

The film thus obtained was irradiated with a mercury lamp for 10 minutes to crosslink, thereby obtaining a crosslinked film.

The crosslinked film obtained had a thickness of 140 μm and a gel fraction of 60%. The film was evaluated on a total light transmittance, a light transmittance at a wavelength of 400 nm, a haze, a retardation and a retardation unevenness. Further, the film was evaluated on heat resistance, and was measured on a dimensional change before and after 220° C. heating. The results obtained are shown in Table 3 below.

The crosslinked film obtained was suitable for use in an optical film for display.

EXAMPLE 14

100 parts by weight of the fumaric diester copolymer obtained in Example 3, 1.5 parts by weight of diphenyl iodonium hexafluorophosphate and 400 parts by weight of tetrahydrofuran were mixed to prepare a 20 wt % solution. 0.35 part by weight of pentaerythritoltetrakis-(3-(3,5-di-t-butyl-4-hydroxyphenyl)propionate) and 1.05 parts by weight of bis(2,6-di-t-butyl-4-methylphenyl)-pentaerythritol diphosphite were added to the solution obtained above to prepare a solution.

The solution thus obtained was flow cast on a support of a solution flow casting device by T die method, and the resulting coating was dried at 40° C., 80° C. and 120° C. for 1 hour, respectively, to prepare a fumaric diester copolymer film having a width of 300 mm, a thickness of 60 μm and a thickness unevenness of 1 μm.

The film obtained was irradiated with a mercury lamp for 10 minutes to crosslink, thereby obtaining a crosslinked film. The crosslinked film obtained had a thickness of 60 μm and a gel fraction of 30%. The film was evaluated on a total light transmittance, a light transmittance at a wavelength of 400 nm, a haze, a retardation and a retardation unevenness. Further, the film was evaluated on heat resistance, and was measured on a dimensional change before and after 220° C. heating. The results obtained are shown in Table 3 below.

The crosslinked film obtained was suitable for use in an optical film for display.

TABLE 3

| | Total light transmittance (%) | Light transmittance at a wavelength of 400 nm (%) | Haze (%) | Retardation (nm) | Retardation Unevenness (nm) | Appearance after 220° C. heating | Dimensional change (%) |
|---|---|---|---|---|---|---|---|
| Example 13 | 93 | 91 | 0.4 | 0 | 0 | ○ | 0.007 |
| Example 14 | 93 | 91 | 0.4 | 0 | 0 | ○ | 0.005 |

EXAMPLES 15 TO 17

Formation of Gas Barrier Layer

Silicon nitride layer in a thickness of 100 nm was formed on both sides of the crosslinked film obtained in Example 13 by sputtering under the following conditions (Example 15). Similarly, silicon oxide layer was formed on both sides of the film (Example 16), and silicon nitric oxide layer was formed on both sides of the film (Example 17).

Temperature of film formation: Room temperature
Background pressure: $1 \times 10^{-7}$ torr
Sputter gas pressure: 0.6 Pa (Ar: 80 SCCM, $N_2$: 20 SCCM)
Voltage applied: RF Magnetron 500 W Each of the optical films for display obtained was measured on a haze, a moisture permeability and a dimensional change before and after 220° C. heating. The results obtained are shown in Table 4 below.

TABLE 4

| | Haze (%) | Moisture permeability (g/m²/day) | Appearance after 220° C. heating | Dimensional change (%) | Gas barrier layer |
|---|---|---|---|---|---|
| Example 13 | 0.4 | 50 | ○ | 0.007 | None |
| Example 15 | 0.9 | <0.1 | ○ | 0.002 | Silicon nitride |

TABLE 4-continued

| | Haze (%) | Moisture permeability (g/m²/day) | Appearance after 220° C. heating | Dimensional change (%) | Gas barrier layer |
|---|---|---|---|---|---|
| Example 16 | 0.6 | <0.1 | ○ | 0.004 | Silicon oxide |
| Example 17 | 0.7 | <0.1 | ○ | 0.002 | Silicon nitric oxide |

EXAMPLE 18

Formation of Hard Coat Layer

An ultraviolet curing resin composition comprising 75 parts by weight of an ultraviolet curing urethane acrylate, 10 parts by weight of 1,6-hexanediol acrylate, 10 parts by weight of isobornyl acrylate, 3.5 parts by weight of a photoinitiator (trade name: DAROCUR 1173, a product of Ciba Specialty Chemicals), 1.4 parts by weight of an antioxidant (trade name: IRGANOX 1010, a product of Ciba Specialty Chemicals), and 0.1 part by weight of a silicon-based leveling agent was applied to both sides of the crosslinked film having a thickness of 140 μm obtained in Example 13 at a thickness of 4 μm with a coater. The film thus treated was irradiated with a high pressure mercury lamp to produce a film having hard coat layers.

The film obtained was evaluated on optical properties and surface hardness. The results obtained are shown in Table 5 below.

EXAMPLE 19

Formation of Hard Coat Layer

An ultraviolet curing resin composition comprising 60 parts by weight of an ultraviolet curing epoxy acrylate, 20 parts by weight of 1,6-hexanediol acrylate, 15 parts by weight of isobornyl acrylate, 3.5 parts by weight of a photoinitiator (trade name: DAROCUR 1173, a product of Ciba Specialty Chemicals), 1.4 parts by weight of an antioxidant (trade name: IRGANOX 1010, a product of Ciba Specialty Chemicals), and 0.1 part by weight of a silicon-based leveling agent was applied to a film having a silicon nitride layer obtained in Example 15 at a thickness of 4 μm with a coater. The film thus treated was irradiated with a high pressure mercury lamp. The optical film for display thus obtained was evaluated on optical properties and surface hardness. The results obtained are shown in Table 5 below.

TABLE 5

| | Gas barrier layer | Hard coat layer | Haze (%) | Surface hardness | Appearance after 220° C. heating |
|---|---|---|---|---|---|
| Example 13 | None | None | 0.4 | HB | ○ |
| Example 18 | None | Present | 0.5 | 2H | ○ |
| Example 19 | Present | Present | 0.9 | 3H | ○ |

EXAMPLE 20

Production of Protective Film for Polarizing Plate

A crosslinked film having a thickness of 60 μm and a thickness unevenness of 2 μm was produced in the same manner as in Example 14.

An ethyl acetate solution of a polyester polyol and an isocyanate was applied to one side of the film obtained above with a bar coater. The films thus treated were adhered to both sides of a polyvinyl alcohol/iodine polarizing plate, and the resulting laminate was heat treated at 120° C. for 1 hour. The films laminated did not separate from the polarizing plate by heating, and could be used as a protective film for polarizing plate.

EXAMPLE 21

Production of Retardation Film

The crosslinked film obtained in Example 13 was cut into a 5 cm square, and the cut piece was stretched with a biaxial stretching machine (manufactured by Imoto Seisakusho) under the condition at a temperature of 180° C. to prepare a film. The film obtained had a thickness of 80 μm, and a retardation of 10 nm, and therefore was suitable for use in a retardation film.

EXAMPLE 22

Production of Touch Panel Film

A transparent conductive film (ITO film) was formed on the film having gas barrier layers laminated obtained in Example 15, by the following method to produce a film. The film obtained had a total light transmittance of 93% and a haze of 0.4%. Further, the film showed heat resistance higher than the sputtering temperature (200° C.) when forming ITO film, and was therefore suitable for use in a touch panel film.

Film Formation Conditions of Transparent Conductive Film:
 Film formation temperature: 200° C.
 Background pressure: $1 \times 10^{-7}$ torr
 Sputtering gas pressure: 0.6 Pa (Ar: 80 SCCM, $O_2$: 20 SCCM)
 Voltage applied: RF magnetron 500 W

EXAMPLE 23

Production of Plastic Film Substrate

A transparent electrode film (ITO film) was provided on the film having gas barrier layers and a hard coat layer obtained in Example 19 by sputtering (sputtering temperature: 200° C.). A polyimide oriented film was applied to the ITO layer by spin coating, baked at 180° C. for 1 hour, and then subjected to rubbing treatment. Spacers were sprayed on the film substrate thus produced, and two film substrates were fixed with a sealant such that up and down rubbing directions are vertical. After curing the sealant, liquid crystals were injected by vacuum injection, and the port was encapsulated with an epoxy resin to prepare a liquid crystal cell. Polarizing plates (trade name: NPF, a product of Nitto Denko Corporation) were adhered to the top and down portions of the cell, and display properties were evaluated. White display and black display were uniform, and thus uniform and even display was possible. Further, the liquid crystal display device thus produced was flexible, and was suitable for use in a plastic substrate for liquid crystal display.

While the invention has been described in detail and with reference to specific embodiments thereof, it will be apparent to one skilled in the art that various changes and modifications can be made therein without departing from the spirit and scope thereof.

What is claimed is:

1. A fumaric diester copolymer, comprising:
a fumaric diester residue unit represented by the following general formula (1), and a (meth)acrylic ester residue unit represented by the following general formula (2), the copolymer having a number average molecular weight of from 1,000 to 500,000,

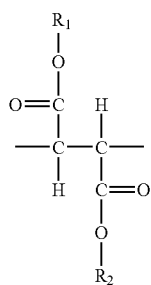

(1)

wherein $R_1$ and $R_2$ each independently represents a linear alkyl group having from 1 to 6 carbon atoms, a branched alkyl group having from 1 to 6 carbon atoms, or a cyclic alkyl group having from 3 to 6 carbon atoms,

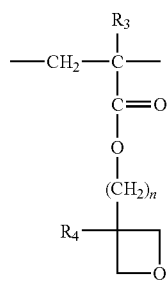

(2)

wherein $R_3$ represents hydrogen or methyl group, $R_4$ represents hydrogen, a linear alkyl group having from 1 to 4 carbon atoms, or a branched alkyl group having from 1 to 4 carbon atoms, and n is 1 or 2.

2. The fumaric diester copolymer as claimed in claim 1, wherein the fumaric diester residue unit is a diisopropyl fumarate residue unit.

3. The fumaric diester copolymer as claimed in claim 1, wherein the (meth)acrylic ester residue unit is 3-ethyl-3-oxetanylmethyl acrylate residue, or 3-ethyl-3-oxetanylmethyl methacrylate residue.

4. A crosslinked product of a fumaric diester copolymer, obtained by crosslinking the fumaric diester copolymer of in claim 1.

5. A film comprising the crosslinked product of a fumaric diester copolymer of in claim 4.

6. An optical film for display, comprising the film of in claim 5, the film being a crosslinked film having a thickness of from 10 to 700 μm, and a gel fraction, as determined by a tetrahydrofuran insoluble content, of 10% or more.

7. The optical film for display according to in claim 6, having a total light transmittance of 85% or higher, a light transmittance at 400 nm of 80% or higher, and a haze of 2% or lower.

8. The optical film for display according to in claim 6, having a thickness unevenness of 10 μm or less, a retardation measured from a front of a film of 10 nm or less, and a retardation unevenness within the film plane of 5 nm or less.

9. The optical film for display according to in claim 6, further comprising at least one gas barrier layer laminated thereon.

10. The optical film for display according to in claim 6, further comprising at least one hard coat layer laminated thereon.

11. A film for protecting a polarizing plate, comprising the optical film for display of in claim 6.

12. A retardation film, comprising the optical film for display of in claim 6.

13. A touch panel film, comprising the optical film for of in claim 6.

14. A film substrate for flat panel display, comprising the optical film for display of in claim 6.

15. A plastic film substrate for liquid crystal display, comprising the optical film for display of in claim 6.

16. The fumaric diester copolymer according to in claim 1, wherein the copolymer has a number average molecular weight of from 40,000 to 500,000.

17. A fumaric diester copolymer, consisting of:
a fumaric diester residue unit represented by the following general formula (1), and (meth)acrylic ester residue unit represented by the following general formula (2), the copolymer having a number average molecular weight of from 1,000 to 500,000,

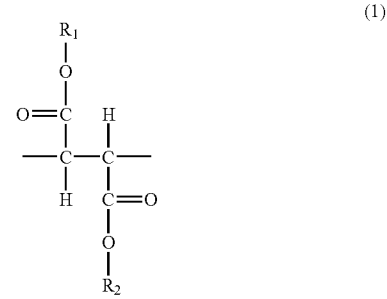

(1)

wherein $R_1$ and $R_2$ each independently represents a linear alkyl group having from 1 to 6 carbon atoms, a branched alkyl group having from 1 to 6 carbon atoms, or a cyclic alkyl group having from 3 to 6 carbon atoms,

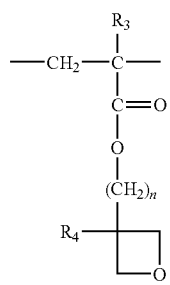 (2)

wherein $R_3$ represents hydrogen or methyl group, $R_4$ represents hydrogen, a linear alkyl group having from 1 to 4 carbon atoms, or a branched alkyl group having from 1 to 4 carbon atoms, and n is 1 or 2.

18. The fumaric diester copolymer as claimed in claim 1, wherein the (meth)acrylic ester residue unit is selected from the group consisting of 3-ethyl-3-oxetanylmethyl acrylate residue and 3-ethyl-3-oxetanylmethyl methacrylate residue.

19. The fumaric diester copolymer of in claim 1, which is crosslinked.

\* \* \* \* \*